(12) United States Patent
Banfi

(10) Patent No.: US 10,373,479 B2
(45) Date of Patent: Aug. 6, 2019

(54) EMERGENCY DEVICE TO BE WORN BY DIVERS

(71) Applicant: SHARKNET S.r.l., Imbersago (LC) (IT)

(72) Inventor: Maurizio Banfi, Imbersago (IT)

(73) Assignee: Sharknet S.r.l, Imbersago (LC) (IT)

(*) Notice: Subject to any disclaimer, the term of this patent is extended or adjusted under 35 U.S.C. 154(b) by 0 days.

(21) Appl. No.: 15/505,618

(22) PCT Filed: Oct. 26, 2015

(86) PCT No.: PCT/EP2015/074765
§ 371 (c)(1),
(2) Date: Feb. 22, 2017

(87) PCT Pub. No.: WO2016/071142
PCT Pub. Date: May 12, 2016

(65) Prior Publication Data
US 2017/0243471 A1    Aug. 24, 2017

(30) Foreign Application Priority Data

Nov. 3, 2014  (IT) .................. LC140007 U

(51) Int. Cl.
*B63C 9/00* (2006.01)
*H04B 1/38* (2015.01)
(Continued)

(52) U.S. Cl.
CPC ............ *G08B 25/016* (2013.01); *B63C 11/26* (2013.01); *G01S 19/17* (2013.01); *G08B 21/088* (2013.01);
(Continued)

(58) Field of Classification Search
CPC ..... G08B 25/016; G08B 21/088; B63C 11/26; B63C 2011/021; B63C 11/02; B63C 2011/005
See application file for complete search history.

(56) References Cited

U.S. PATENT DOCUMENTS 5,517,199 A * 5/1996 DiMattei ............... G01S 5/0027
                                                  342/357.31
5,523,982 A * 6/1996 Dale ...................... H04B 11/00
                                                  367/131
(Continued)

OTHER PUBLICATIONS

International Search Report in PCT/EP2015/074765 dated Jan. 25, 2016.
(Continued)

*Primary Examiner* — Joseph H Feild
*Assistant Examiner* — Rufus C Point
(74) *Attorney, Agent, or Firm* — Manelli Selter PLLC; Edward Stemberger

(57) ABSTRACT

It is described an emergency device (100) for divers comprising a watertight case (101) structured to assume a submerged position and an emerged position. The watertight case includes: a depth sensor (102) configured to determine a depth value associated with the submerged position assumed by the emergency device when a user activates an emergency procedure; a positioning device (103) configured to determine a geographic position, including latitude and longitude, assumed by the emergency device (100) in the emerged position; a GSM or satellite telephone transmitter/receiver (104) configured to transmit an emergency message comprising said depth value and said geographic position.

15 Claims, 2 Drawing Sheets

(51) Int. Cl.
*H04W 4/80* (2018.01)
*B63C 11/02* (2006.01)
*B63C 11/26* (2006.01)
*G01S 19/17* (2010.01)
*G08B 21/08* (2006.01)
*G08B 25/01* (2006.01)

(52) U.S. Cl.
CPC ... *B63B 2203/02* (2013.01); *B63C 2009/0017* (2013.01); *B63C 2011/021* (2013.01); *H04B 2001/3894* (2013.01); *H04W 4/80* (2018.02)

(56) References Cited

U.S. PATENT DOCUMENTS

| | | | | |
|---|---|---|---|---|
| 5,956,291 | A * | 9/1999 | Nehemiah | H04B 11/00 367/131 |
| 6,125,080 | A * | 9/2000 | Sonnenschein | B63C 11/02 367/134 |
| 6,856,578 | B2 * | 2/2005 | Magine | B63C 11/26 367/134 |
| 7,333,394 | B2 * | 2/2008 | Basilico | G01C 21/00 367/124 |
| 7,388,512 | B1 * | 6/2008 | Moorer, Jr. | B63C 11/26 340/539.1 |
| 7,477,207 | B2 * | 1/2009 | Estep | B63C 11/12 345/7 |
| 7,492,251 | B1 | 2/2009 | Katz | |
| 7,969,822 | B2 * | 6/2011 | Basilico | G01S 1/72 367/128 |
| 8,174,436 | B2 * | 5/2012 | Hollis | B63C 11/26 342/357.2 |
| 8,508,382 | B1 * | 8/2013 | Novak | B63C 11/26 114/329 |
| 8,654,610 | B2 * | 2/2014 | Megdal | G01S 5/0045 367/117 |
| 8,718,936 | B2 * | 5/2014 | Fountain | G01C 21/34 701/472 |
| 8,847,818 | B2 * | 9/2014 | Hollis | B63C 11/26 342/357.2 |
| 9,443,039 | B2 * | 9/2016 | Hollis | G06F 17/40 |
| 9,616,982 | B2 * | 4/2017 | Hollis | B63C 11/26 |
| 2006/0196499 | A1 | 9/2006 | Cannissaro | |
| 2007/0006472 | A1 * | 1/2007 | Bauch | G01C 17/00 33/355 R |
| 2007/0014189 | A1 * | 1/2007 | Basilico | G01S 1/72 367/128 |
| 2009/0135022 | A1 * | 5/2009 | Hollis | B63C 11/26 340/850 |
| 2009/0141591 | A1 * | 6/2009 | Basilico | G01S 1/72 367/128 |
| 2009/0295566 | A1 * | 12/2009 | Weintraub | G08B 21/088 340/539.11 |
| 2011/0055746 | A1 * | 3/2011 | Mantovani | B63C 11/26 715/771 |
| 2012/0243375 | A1 * | 9/2012 | Melvin, II | G01S 3/8083 367/127 |
| 2013/0025904 | A1 * | 1/2013 | Berumen | G06F 1/1626 174/50.5 |
| 2013/0144558 | A1 * | 6/2013 | Hollis | G06F 17/40 702/187 |
| 2013/0171956 | A1 | 7/2013 | Lever | |
| 2013/0257621 | A1 * | 10/2013 | Juergensen | B63C 11/02 340/626 |

OTHER PUBLICATIONS

Written Opinion of the ISA in PCT/EP2015/074765 dated Jan. 25, 2016.

* cited by examiner

EMERGENCY DEVICE TO BE WORN BY DIVERS

TECHNICAL FIELD

The present invention relates to a device for the emergency location of divers.

DESCRIPTION OF THE RELATED ART

The location of a diver in an emergency is performed using "Personal Locator Beacon" (PLB) devices. These devices, once manually activated at the surface, transmit position data (read by an integrated GPS module) to a satellite network. The satellites re-transmit the emergency signal to a worldwide network of "Search And Rescue" (SAR) organizations, which organize the rescue operations.

As an alternative to the devices described above, there are devices which integrate a GPS receiver and a telephone or satellite transmission module. These devices, when activated, transmit their positional data to previously memorized telephone numbers or email addresses. These devices are generally used for land applications but, in principle, they may also be used (from the surface) by divers who are in difficulty.

Depth gauges are also known: these devices are used by divers to measure and indicate depth.

BRIEF SUMMARY OF THE INVENTION

The technical problem addressed by the present invention is that of providing an emergency device that allows increasing the safety of divers in comparison to the known devices.

The above mentioned problem is solved by an emergency device and diving monitoring system as described by the appended claims.

In accordance with an example, the emergency device makes it possible for the diver in difficulty to send an emergency message (SMS, phone call, e-mail or other form of electronic notification) in a completely automated manner, via a GSM or satellite telephone connection, where his/her geographical position and depth are indicated.

In accordance with a particular embodiment, the emergency device for divers allows a scuba diving school or a Dive Centre to automate the "check in" process of each diver, once registered for a group dive, and to monitor the presence of each diver, both before and after the dive. Moreover, according to a particular embodiment, at the end of each dive, the device automatically communicates the dive data (location of the dive, depth and time spent at each depth) to a central computer. Such data are then accessible by the diver or any other organization (such as an insurance company) which may be interested in monitoring the dive activities.

BRIEF DESCRIPTION OF THE DRAWINGS

Further characteristics and advantages will be more apparent from the following description of a preferred embodiment and of its alternatives given as a way of an example with reference to the enclosed drawings in which.

DETAILED DESCRIPTION

Figure 1:
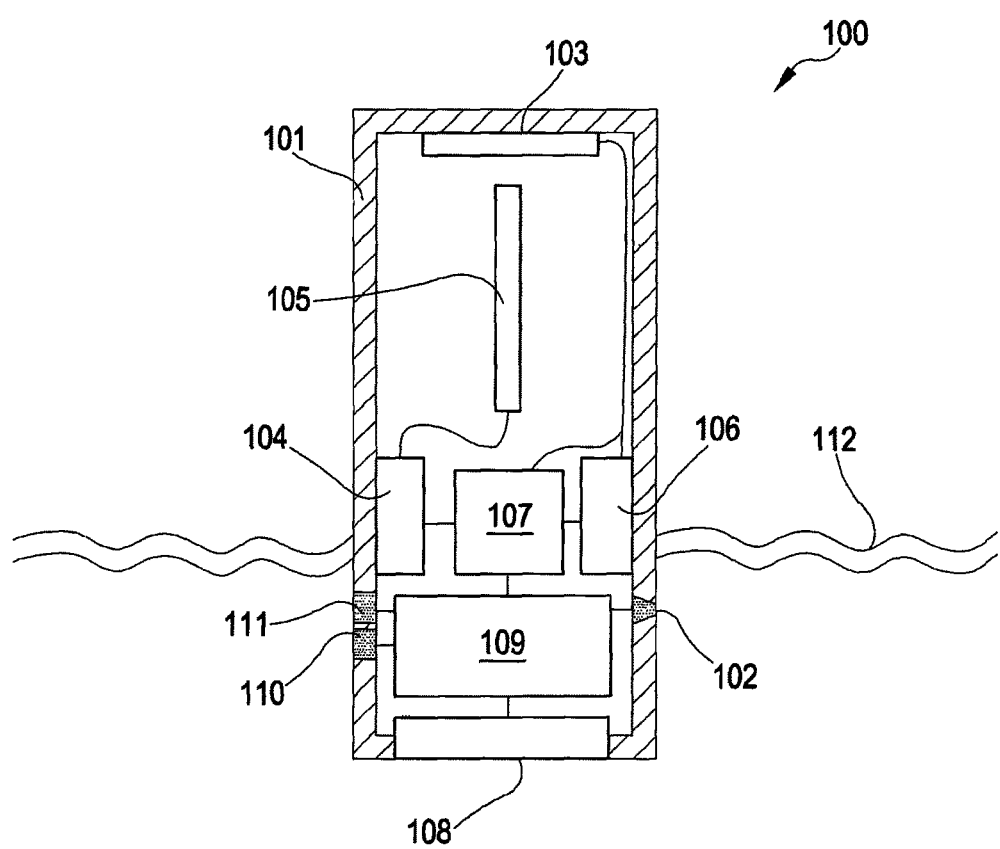
FIG. 1 shows an example of an emergency device for divers.

FIG. 1 shows an example of an emergency device 100 employable by divers. Particularly, the emergency device 100 can operate as an emergency apparatus capable of transmitting the geographic position of the diver (in terms of Latitude and Longitude) as well as his/her depth (under the water surface) at the moment in which an alarm is activated.

Moreover, in accordance with the particular embodiment described, the emergency device 100 can perform at least one of the following functions:

gathering all data related to each dive (geographical position of the point of dive and depth gradually reached over the course of time) and automatically transmit it to a pre-set telephone number, email or web address;

assist diving schools or organizations that organize group dives in exchanging the data necessary for a diver to take part in a group dive and keep track of all the divers on the surface, displaying their presence until they submerge and, again, from the moment when on resurfacing, they return to the vicinity of a support boat.

Description of the Hardware Architecture

With reference to the specific example of FIG. 1, the emergency device 100 is provided with a watertight container 101 having, as an example, a positive buoyancy. The watertight container 101 contains the following components:

a pressure sensor 102,
a GPS receiver 103 provided with an integrated first antenna (not shown) and
a GSM or satellite telephone transmitter/receiver 104 provided with a second antenna 105.

Particularly, the emergency device 100 shown in FIG. 1 is also provided with:

a Bluetooth module 106 having an integrated third antenna (not shown);
a processing and storage module 107;
a digital display 108;
a battery with relative charge and management circuitry 109;
a first watertight switch 110 for switching on/off the emergency device 100;
a second watertight switch 111 for starting emergency operations.

It is observed that FIG. 1 schematically shows the emergency device 100 in an emerged position in which it floats at the water surface 112. However, the user can wear the emergency device 100 during a dive, so the emergency device 100 reaches a submerged position together with the user (i.e. the diver). As an example, the watertight container 101 is provided with one or more belts, bands, straps or other fastening means which allow fastening in a removable manner the emergency device 100 to the diver's body or to the diver's equipment.

Particularly, the pressure sensor 102 is configured to operate as depth sensor to determine depth values associated with emerged and submerged positions assumed by the emergency device 100. The pressure sensor 102 is structured to send electrical signals carrying the detected pressure values (corresponding to depth values) to the processing and storage module 107.

The GPS (Global Positioning System) receiver 103 is configured to determine geographic positions, including latitude and longitude, assumed by the emergency device 100 in emerged positions.

The GSM or satellite telephone transmitter/receiver 104 is configured to transmit messages (particularly SMS messages), as will be clarified later, to specific telephone numbers. The SMS message includes an emergency message i.e. a content indicating that an emergency situation is occurred.

The GSM or satellite telephone transmitter/receiver 104 also allows to send e-mails and/or data over a telecommunication network, such as Internet.

The processing and storage module 107 is connected with: the pressure sensor 102, the GPS receiver 103, the Bluetooth module 106 and the digital display 108. Moreover, the processing and storage module 107 is connected with the first watertight switch 110 and the second watertight switch 111.

The processing and storage module 107 is provided with a suitable software application 204 (schematically shown in FIG. 2) which is configured to manage data received from the modules connected to the processing and storage module 107 and generates and sends command or control signals to the other modules. Particularly, the data processing and storage module 107 is configured to store at least one telephone number, email address or web address to which said emergency message has to be sent.

Moreover, the processing and storage module 107 is configured to activate the telephone transmitter/receiver 107 to automatically transmit the emergency message when the emerged position is reached by the emergency device 100, in an emergency situation.

The second watertight switch 111 is an example of an emergency procedure activation device and can be activated by the diver to send a corresponding electrical signal to the data processing and storage module 107 to indicate that emergency situation occurs and so triggering an emergency procedure managed by the data processing and storage module 107.

According to a particular embodiment, the second watertight switch 111 is an accelerometer configured to detect taps given to the emergency device 100 by the diver to trigger the emergency procedure. Moreover, in accordance with a preferable embodiment this accelerometer can also play the role of the first watertight switch 110: when the emergency device 100 is in a still position for a pre-established amount of time the accelerometer brings, via the processing and storage module 107, the emergency device 100 in a stand-by status. When the emergency device 100 is moved, the accelerometer sends corresponding signals to the processing and storage module 107 which activates the the emergency device 100. The use of an accelerometer as first and second switches 110 and 111 shows the advantage of avoiding any watertight solution to implement any mechanical switch.

In accordance with a preferable embodiment, the battery and the management circuitry 109 can include a wireless charge module and a coil which allow charging the battery without any need for watertight electrical connectors.

Figure 2:
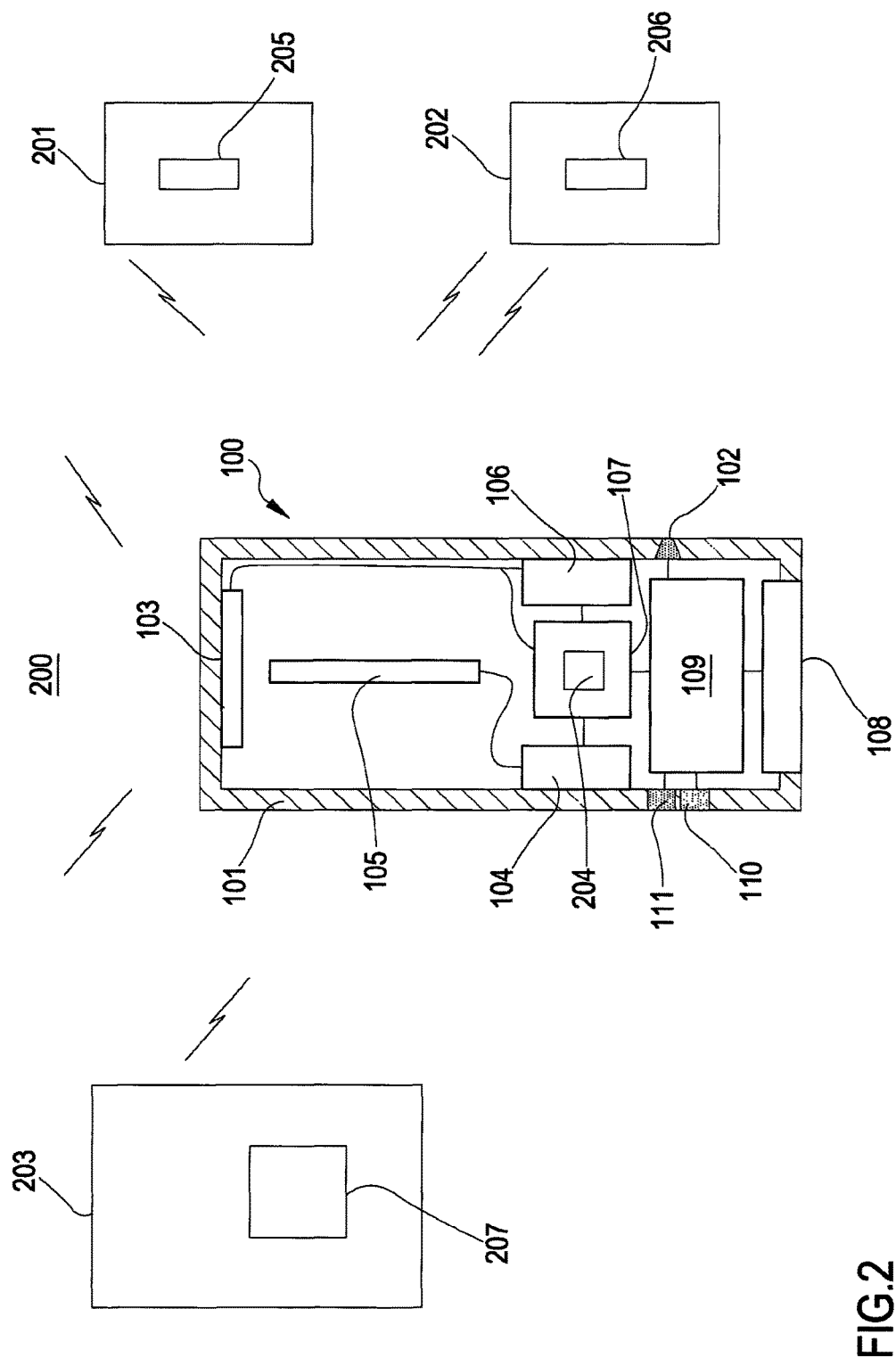
FIG. 2 shows an embodiment of a dive monitoring system employing said emergency device.

FIG. 2 shows a diving monitoring system 200 comprising at least an emergency device 100 as described above, a first communication device 201, at least a second communication device 202 and a central computer 203.

The first communication device 201 can be associated with the user of the emergency device 100 and is configured to communicate with the emergency device 100 by means of a Bluetooth standard. Particularly, the first communication device 201 can be a Personal Computer, a tablet or a Smartphone and is provided with a first software application 205 configured to operate as software interface allowing the user exchanging data/information with the emergency device 100.

The second communication device 202 can be analogous to the first communication device 201 but is, as an example, associated with a diving instructor and includes a second software application 206 configured to operate as software interface allowing the instructor sending and receiving data/information from the emergency device 100.

The central computer 203 (particularly, a server computer), according to an example, includes a database 207 containing data/information on the users of a plurality of emergency devices 100. The central computer 203 can be connected to the Internet in order to receive electronic messages (e.g. e-mail) from the emergency devices 100.

It is observed that according to further embodiments of the diving monitoring system 200, the central computer 203 or the second communication device 202 can be omitted.

With reference to the operation of the emergency device 100 and the diving monitoring system 200, examples of the following operating steps will be described hereinafter: initial setting, monitoring divers on the surface, operation during a dive, emergency operation, automatic sending of dive data.

Initial Setting Step

The user (i.e. the diver) uses the first communication device 201 (hereinafter, first tablet 201) to set his emergency device 100. When the emergency device 100 is on (i.e. activated by the first watertight switch 110) and the pressure sensor 102 detects values close to the atmospheric pressure, the processing and storage module 107 recognizes that it is surface and activates the Bluetooth module 106, which in turn transmits its presence while awaiting connection.

When the emergency device 100 is connected (e.g. via the Bluetooth technology) to the first tablet 201, the software application 204 and the first software application 205 allow the user to set in the emergency device 100 one or more phone numbers to which the emergency messages (e.g. SMS) have to be sent, if necessary. During this preliminary setting step the user can also set any personal information (name, certifications obtained as diver, age, medical history, etc.). All of these initial data/information are then stored in the memory of the processing and storage module 107.

Monitoring Divers on the Surface

Once the initial setting step described above has been completed, the emergency device 100 waits for any additional Bluetooth connections and shows (in the digital display 108), battery status, Bluetooth connection status and any GPS, GSM or satellite coverage status.

When the emergency device 100 is in this state, the second communication device 202, by means of the corresponding second software application 206 (which is activated, as an example, by the diving school instructor or the group diving attendee), can:

initially (i.e. before the dive starts) query the emergency device 100 requesting certain personal data of the diver (e.g. name, certifications held, any relevant medical data);

automatically load into the emergency device 100 one or more additional phone numbers and/or email addresses and/or web addresses to which the emergency message should be sent in the event of an emergency; according to a specific embodiment, these additional phone numbers, email addresses and/or web addresses the diving school and staff who will remain to provide assistance to the divers from a support boat.

Moreover, the second communication device 202 can periodically query the emergency device 100 (and any other emergency device 100 belonging to all divers of the school or group) to check if the associated diver is present. At this purpose, the second communication device 202 sends enquiring signals that are received by the emergency device 100. As long as each emergency device 100 is in the vicinity of the second communication device 202, each emergency device 100 responds positively, confirming presence by sending corresponding signals (e.g. by means of Bluetooth technology). When the diver submerges, the emergency device 100 stops responding to the queries, to then resume at the end of the dive when the diver returns to the vicinity of the second communication device 202 (for example, on the support boat). It is observed that the above check, made automatically and by means of the wireless technology, allows to avoid the loss of divers at the end of a dive.

Moreover, it is possible to send SMS messages (e.g. by means of the second communication device 202) to the emergency device 100 asking for the current position of the emergency device 100. In this case, if the emergency device 100 is in the emerged position, the processor and storage module 107 automatically responds by transmitting, via the GSM or satellite telephone transmitter/receiver 104, a message indicating the position obtained by the GPS receiver 103.

Operation During a Dive when the pressure sensor 102 indicates the beginning of a dive, the emergency device 100 automatically (i.e. under the control of the processing and storage module 107) stores the last GSP position data (which becomes the position attributed to the whole dive) provided by the GPS receiver 103. Moreover, the processing and storage module 107 periodically reads the depth measured by the pressure sensor 102, displays it in the digital display 108 and stores it along with the corresponding time.

Emergency Operation

In the event of an emergency occurred in a submerged position, the diver operates the second watertight switch 111 to activate an emergency procedure. Subsequently, the diver releases the emergency device 100 (which may be connected to a spool) which, due to its positive buoyancy, reaches the water surface, i.e. the emerged position. The processing and storage module 107 recognizes that the emerged position is reached thanks to the pressure values provided by the pressure sensor 102 and activates the GSM or satellite telephone transmitter/receiver 104 which searches for a telephone or satellite connection and, when found, transmits the emergency messages (particularly, SMS) to the telephone numbers previously set.

The emergency messages contain both the geographical location data (latitude and longitude) read by the GPS receiver 103 when the surface is reached, and the value of depth that had been read by the pressure sensor 102 when the second watertight switch 111 was activated by the diver.

It is observed that, according to a particular embodiment, if the second watertight switch 111 is an accelerometer, the diver can trigger the emergency procedure by tapping the emergency device 100: the accelerometer 111 detects these taps (e.g. a pre-established number of taps) and provides a corresponding signal to the processing and storage module 107.

According to an additional or alternative functionality, the processing and storage module 107 can be configured to activate the emergency procedure even if the user does not operate the second watertight switch 111 but only on the basis of values provided by the pressure sensor 102 corresponding to a fast decrease of the pressure, representing a fast emergence of the emergency device 100 worn or not by the diver.

In greater detail, when the processing and storage module 107 receives from the pressure sensor 102 decreasing pressure values, it computes the decreasing rate, evaluated on a predetermined time interval. Moreover, the processing and storage module 107 compares the computed decreasing rate with a pre-established threshold and, if the computed decreasing rate is greater than the pre-established threshold, an emergency situation is automatically recognised. In this status and at the reaching of the emerged position the processing and storage module 107 automatically activates the GSM or satellite telephone transmitter/receiver 104 in order to send the emergency messages as indicated above.

According to a particular embodiment concerning the manner to reach the emerged position, when the diver is in an emergency situation he can mount the emergency device 100 to an ordinary divers' emergency buoy which is then automatically inflated. The inflated buoy is subsequently let go to reach the emerged position together with the emergency device 100 which can start sending the emergency messages.

Automatic Sending of Dive Data

Once the dive has terminated (the pressure sensor 102 indicates the occurred return to the water surface), as soon as the emergency device 100 acquires a GSM or satellite connection, it sends all the data relating to the dive which has just terminated to a preset e-mail or web address associated with the central computer 203. The data include: identification data of the diver, the geographical location of the dive site and all the data regarding depth and time spent at each depth. These data are stored in the database 207 of the central computer 203 and can be later accessed and visualized by the diver (e.g. after a password protected login to the central computer).

The processing and storage module 107 can be programmed so that, once the option to send the above data has been set, the diver is not able to disable/re-enable it.

The emergency device 100 can be employed, as an example, within a diving school or a center which organizes group dives, the emergency device 100 allows data exchange between the diving school or diving center (provided with the second communication device 202) and the process to verify if each diver is suited for any specific activity and to include him within a specific diving list is completely automated.

Moreover, the described emergency device 100 can be employed within a diving school or a center which organizes group dives: the emergency device 100 allows the organizers and guides to always have a clear and immediate indication of the presence of all divers especially at the end of a dive (it is not uncommon for the support boat to 'forget' a diver at sea). If a diver is not detected at the end of a dive, the emergency function allows the diver to be quickly located.

Regardless of whether the dive is collective or individual, the emergency device 100 increases the safety of divers, allowing divers in trouble under water or lost on the surface to transmit the emergency message indicating their geographical location and depth. It is observed that the value of the depth included into the emergency message is important to allow a timely rescue since this value, together with the geographic position data, completely identifies the diver location under the water surface.

Moreover, through the feature which allows the transmission of data regarding each dive (without the need or option of user intervention), insurance companies which offer policies covering the risks experienced by divers can receive all the data relating to the dives carried out by their policy holders and use them for statistical purposes and for checking the "correctness" of the policy holder in complying with the limitations imposed by their licence, the correct decompression curves, etc. In addition, the data relating to the dive (particularly, the depth profile) play an important role in planning a proper medical assistance to the diver in difficulty.

LEGEND OF THE ELEMENTS SHOWN IN THE DRAWINGS

100: emergency device
101: watertight container
102: pressure sensor
103: GPS receiver
104: GSM or satellite telephone transmitter/receiver
105: second antenna
106: Bluetooth module
107: processing and storage module
108: digital display
109: battery
110: first watertight switch
111: second watertight switch
112: water surface
200: diving monitoring system
201: first communication device
202: second communication device
203: central computer
204: software application
205: first software application
206: second software application
207: database

The invention claimed is:

1. An emergency device for divers, comprising:
a watertight case structured to assume a submerged position and an emerged position, the watertight case including:
  a depth sensor configured to determine a depth value associated with the submerged position assumed by the emergency device when a user activates an emergency procedure;
  a positioning device configured to determine a geographic position, including latitude and longitude, assumed by the emergency device in the emerged position;
  a GSM or satellite telephone transmitter/receiver configured to transmit an emergency message comprising said depth value and said geographic position,
wherein said watertight case further comprises:
  a data processing and storage module connected to said depth sensor, positioning device and said telephone transmitter/receiver; wherein said data processing and storage module is configured to:
  store at least one telephone number, email address or web address to which said emergency message has to be sent;
  activate said telephone transmitter/receiver to automatically send the emergency message when the emergency procedure is activated and the emerged position is reached.

2. The emergency device of claim 1, further comprising a communication module connected to said processing and storage module and structured to allow reception of data corresponding at least to one telephone number, e-mail address or web address to be stored into the processing and storage module.

3. The emergency device of claim 2, wherein said communication module is a Bluetooth module.

4. The emergency device of claim 1, wherein:
the depth sensor is configured to detect that the emergency device has reached submerged position and to send a corresponding first electrical signal to said data processing and memorization module.

5. The emergency device of claim 1, further comprising:
an emergency procedure activation device configured to send a corresponding second electrical signal to the data processing and memorization module to indicate an emergency situation and activate the emergency procedure.

6. An emergency device for divers, comprising:
a watertight case structured to assume a submerged position and an emerged position, the watertight case including:
  a depth sensor configured to determine a depth value associated with the submerged position assumed by the emergency device when a user activates an emergency procedure;
  a positioning device configured to determine a geographic position, including latitude and longitude, assumed by the emergency device in the emerged position;
  a GSM or satellite telephone transmitter/receiver configured to transmit an emergency message comprising said depth value and said geographic position:
  an emergency procedure activation device configured to send a corresponding second electrical signal to the data processing and memorization module to indicate an emergency situation and activate the emergency procedure,
wherein said watertight case further comprises:
  a data processing and storage module connected to said depth sensor, positioning device and said telephone transmitter/receiver; wherein said data processing and storage module is configured to:
  store at least one telephone number, email address or web address to which said emergency message has to be sent;
  activate said telephone transmitter/receiver to automatically send the emergency message when the emergency procedure is activated and the emerged position is reached,
wherein:
said emergency procedure activation device is an accelerometer configured to detect taps given to the emergency device by the user to trigger the emergency procedure and send the second electrical signal; preferably, said accelerometer is also configured to detect a motion or a still position of the emergency device and send corresponding motion signals to the data processing and memorization module to make the emergency device assume a stand-by status or an active status.

7. The emergency device of claim 1, wherein said depth sensor is a pressure sensor.

8. The emergency device of claim 7, wherein:
said pressure sensor is structured to detect decreasing pressure values associated with an emersion of the emergency device from the submerged position to the emerged position and provide said pressure values to the processing and storage module;
the data processing and storage module is configured to:
evaluate a pressure decreasing rate from the decreasing pressure values and compare said values to a threshold rate, activate the emergency procedure if the pressure decreasing rate is greater than said threshold rate, activate said telephone transmitter/receiver to automatically send the emergency message when the emerged position is reached.

9. The emergency device of claim 1, wherein said watertight case shows a positive buoyancy to reach the emerged position from the submerged position.

10. The emergency device of claim 1, wherein said watertight case is provided with fastening means to fix the emergency device to a divers' emergency buoy in order to reach the emerged position from the submerged position.

11. A diving monitoring system comprising:
the emergency device of claim 1 to be associated with a diver,
a monitoring communication device to be associated with a user and structured to send according to a wireless technology inquiring signals to the emergency device and receive a response signal from said emergency device indicating the presence of the diver at the emerged position nearby the monitoring communication device.

12. The diving monitoring system of claim 11, wherein:
said wireless technology is the Bluetooth standard, and
the emergency device further includes a Bluetooth module connected to the processing and storage module of the emergency device and structured to receive said inquiring signals and transmit said response signal.

13. The diving monitoring system of claim 12, wherein said monitoring communication device is configured to automatically and periodically transmit said inquiring signals.

14. A diver monitoring system comprising:
the emergency device of claim 1 to be associated with a diver,
a central computer configured to operate on the Internet and associated with an e-mail and/or a web address; wherein
the processing and storage module of the emergency device is configured to:
store data/information describing a dive performed by the diver and comprising one or more of the following data: identification data of the diver, geographical location of the dive site, values of the depths reached by the divers and corresponding time values and pressure values;
send, by means of the GSM or satellite telephone transmitter/receiver of the emergency device, said data/information describing a dive to the mail and/or a web address associated with the central computer.

15. The diver monitoring system of claim 14, wherein the processing and storage module of the emergency device is configured to:
send said data describing a dive to the central computer in a completely automated manner, at the end of each dive, upon resurfacing of the emergency device and without the possibility for an operator, particularly the diver, to disable the transmission of said data describing a dive.

* * * * *